United States Patent [19]

Dederer et al.

[11] Patent Number: 5,432,297
[45] Date of Patent: Jul. 11, 1995

[54] POWER LEAD FOR PENETRATING A CRYOSTAT

[75] Inventors: Jeffrey T. Dederer, Wilkins Township; Jiing-Liang Wu, Murrysville Borough, both of Pa.

[73] Assignee: Westinghouse Electric Corporation, Pittsburgh, Pa.

[21] Appl. No.: 933,626

[22] Filed: Aug. 21, 1992

[51] Int. Cl.⁶ ............................................. H01B 12/00
[52] U.S. Cl. .............................. 174/15.4; 174/15.5; 174/125.1; 505/700; 505/875; 505/885; 505/899
[58] Field of Search ................... 174/15.4, 15.5, 125.1; 505/1, 706, 885, 898, 886, 892, 220, 231, 700, 856, 875, 900

[56] References Cited

U.S. PATENT DOCUMENTS

| | | |
|---|---|---|
| 3,603,715 | 9/1971 | Eilhardt et al. ............... 174/125.1 X |
| 4,369,636 | 1/1983 | Purcell et al. .................. 174/15.4 X |
| 4,895,831 | 1/1990 | Laskaris .................................. 505/1 |
| 4,965,246 | 10/1990 | Suzawa ............................. 174/15.4 |
| 5,166,776 | 11/1992 | Dederer et al. ...................... 505/1 X |

FOREIGN PATENT DOCUMENTS

| | | |
|---|---|---|
| 0043388 | 4/1977 | Japan .............................. 174/15.4 |
| 58-98991A | 6/1983 | Japan . |
| 59-27583A | 2/1984 | Japan . |
| 908199 | 10/1982 | U.S.S.R. . |

OTHER PUBLICATIONS

Richard I. Verga, Superconducting Magnetic Energy Storage and Other Large-Scale SDI Cryogenic Applications Programs 24th Intersociety Energy Conversion Engineering Conference, IECEC-89, The Institute of Electrical and Electronics Engineers, 89CH2781-3.

John R. Hull, High-Temperature Superconducting Current Leads for Cryogenic Apparatus, 24th Intersociety Energy Conversion Engineering Conference, Washington, D.C. Aug. 6-11, 1989 vol. 1, pp. 4591∝464.

Primary Examiner—Leo P. Picard
Assistant Examiner—Hyung S. Sough

[57] ABSTRACT

A multiple circuit hybrid cryostat power lead has a plurality of laterally spaced, electrically isolated lead elements inside a tubular enclosure. Each lead element has an inner section with a high temperature superconducting (HTS) conductor inward of a divider in the tubular enclosure, and an outer normal conductor section outward of the divider. The outer sections of the lead elements have a pair of copper conductors spirally wound in an annular chamber between an electrically insulating central support and an electrically insulating sleeve to form helical flow passages. Cryogen vapor flows outward in the tubular enclosure inward of the divider over the HTS conductors, through a slotted heat exchanger electrically connecting the HTS and copper conductors at the divider, and through the helical flow passages to vents at outer terminals. Flow distribution in the helical passages is regulated either by a flow baffle diverting flow at an intermediate point in the helical flow passages through apertures in the sleeves into the tubular enclosure for mixing and reintroduction of the mixed cryogen vapor back into the helical passages through additional apertures in the sleeve outward of the flow baffle, or by individual thermally responsive valves in the flow passages.

10 Claims, 3 Drawing Sheets

POWER LEAD FOR PENETRATING A CRYOSTAT

BACKGROUND

1. Field of the Invention

This invention relates to electrical leads for transferring electrical power into and out of devices inside a cryostat, and more particularly to a multi-circuit cryostat power lead.

2. Background of the Invention

Commonly owned U.S. patent application Ser. No. 07/585,419 filed on Oct. 20, 1990 discloses a hybrid vapor cooled power lead for transferring power to and from devices inside a cryostat. Such power leads have application for instance in providing power to and withdrawing power from the magnets of the proposed superconducting supercollider now under development and for large electric power storage magnets. This hybrid power lead has an inner section with high temperature superconducting lead elements. That is, conductors which are superconducting at temperatures well above the 3 or 4 degrees Kelvin required for conventional superconducting materials. Thus, there is no joule heating in this section of the power lead. The outer section of the hybrid power lead incorporates normal conductors such as copper lead elements.

This power lead has a number of high temperature superconductor elements and copper elements all connected in parallel to form a single circuit, high current, lead. A flow of helium vapor from the cryostat is directed over the high temperature superconducting and normal conductor lead, elements by a tubular enclosure. In one embodiment of this earlier hybrid power lead, the tubular enclosure around the copper conductors includes an inner tube in which a secondary cryogen vapor such as nitrogen is introduced, and an outer tube forming an annulus with the inner tube through which the helium vapor from the high temperature superconducting section flows to provide additional cooling for removing the joule heating and conduction heating of the copper conductor section.

There are some applications where it is desirable to have multi-circuit power leads. For instance, the superconducting supercollider has a number of control magnets. While these magnets do not require the huge amounts of power of the main magnets, they still require sizeable power input. Each penetration of the cryostat in which the magnets are enclosed results in a heat loss. Significantly more energy is required to make up the cooling that is lost in a heat leak. Therefore, it is desirable to minimize the heat leaks attributable to penetrations of the cryostat as much as possible.

SUMMARY OF THE INVENTION

It is therefore a primary object of the invention to provide a multi-circuit power lead for a cryostat which minimizes heat leak.

This object and others are realized by the invention which is directed to a multiple circuit power lead for penetrating a cryostat which has a plurality of electrically isolated lead elements inside a tubular enclosure. Each lead element includes an electrically insulating central support and an electrically insulating sleeve concentric with the central support for forming therebetween an annular chamber. One or more electrical conductors extend through, and are preferably spirally wound, within the annular chamber to form helical flow passages. By spirally winding the conductors within the annular chamber, the length of the conductors is increased to thereby decrease conduction heating into the cryostat. Cryogen vapor is introduced into the inner end of the helical flow passages and flows outward through the passages to cool the conductors before passing out through vents at the other ends.

Another aspect of the invention includes means for regulating the distribution of cryogen vapor through the individual lead elements. This is desired because some of the circuits in the power lead may not be carrying power at any given time or there could be other imbalances in the cooling requirements of the individual lead elements. In one embodiment of the invention, distribution of the cryogen vapor is regulated by baffle members blocking the flow of cryogen vapor at an intermediate point in the helical flow passages in the lead elements. Apertures in the electrically insulating sleeve inward of the stop members divert flow of cryogen vapor from the inner sections of the helical flow passages into the tubular enclosure surrounding the lead elements where the vapor from all of the inner sections of the lead elements mixes. Additional apertures in the electrically insulating sleeve outward of the stop members allows the mixed cryogen vapor to reenter the helical passage and flow outward to the vents through the outer sections of the helical passages.

In another embodiment of the invention, cryogen vapor distribution is regulated by thermally responsive valves in the flow passages of the individual lead elements. One such valve includes a valve plate with a valve orifice and a cantilevered bimetal valve element having a free end extending over the valve orifice to meter flow therethrough.

In another embodiment of the thermally responsive valve, a valve plate in the flow passage has one or more valve orifices therein. A valve element with one or more valve apertures therein slides over the valve plane. A bimetal element connected to the valve element slides the valve element over the valve plate to vary registration of the motoring aperture(s) in the valve element with the valve orifice(s) and the valve plate in response to temperature changes in the flow passage in its preferred form, the valve element is circular and the bimetal element is helical and secured inside the insulating sleeve to rotate the valve element with respect to the valve plate.

Preferably, the multiple circuit power lead is a hybrid lead with an outer normal conductor section constructed as described above. The inner section includes high temperature superconducting conductors held in spaced relation inside the tubular enclosure by electrically insulating spacers. The high temperature superconductors of the inner section of the lead elements are connected to the normal conductors of the outer sections by electrically conductive heat exchangers which have a mass and flow passages with a surface area over which cryogen vapor flows to effect a balanced and near zero heat flow between the inner and outer conductors.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
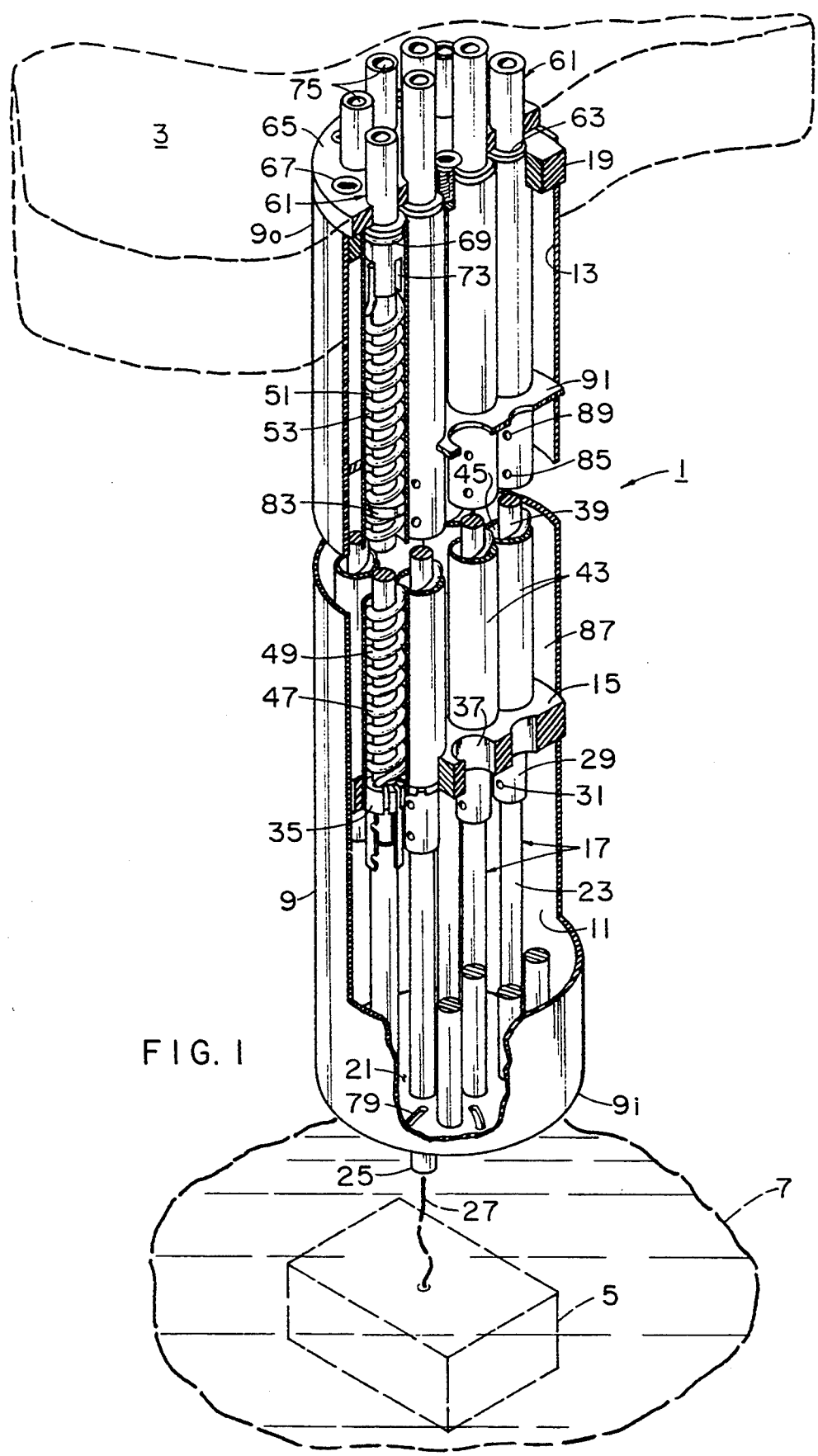
FIG. 1 is a cut-away isometric view of a hybrid cryostat power lead in accordance with the invention.

FIG. 1 illustrates a power lead 1 in accordance with the invention penetrating a cryostat 3 to provide power to or draw power from a device 5 immersed in a pool 7 of liquid cryogen within the cryostat 3. The power lead 1 includes a thermally and electrically insulating tubular enclosure 9 divided into inner 11 and outer 13 sections by a thermally and electrically insulating divider plate 15.

Inside the tubular enclosure 9 is a plurality of lead elements 17 spaced laterally apart within the tubular enclosure 9 and electrically insulated by the divider plate 15, an upper support plate 19, and a lower support plate 21.

Each of the lead elements 17 includes an inner section 17i extending from the inner end 9i to the divider plate 15, and and outer section 17o extending from the divider plate outward to the outer end 9o of the tubular enclosure. A lead element 17 is shown in more detail in FIG. 2. The inner section 17i of the lead element comprises a high temperature superconducting conductor 23. Such conductors are composed of materials having a critical temperature below which they are superconducting which is in the area of 70 to 90 degrees and above Kelvin. Suitable materials for the conductors 23 include ceramic high temperature superconducting materials such as yitrium, barium, copper oxide (YBCO), bismith compounds such as BSCCO and thalium compounds such as TBCCO. The HTS conductors 23 are preferably cylindrical rods with an area coated with silver. These rods are supported at their lower ends by a copper terminal 25 which is soldered to the HTS conductor and extends through the lower support plate 21 and forms the inner terminal which is connected to the device 5 by a superconducting lead shown schematically at 27. The upper ends of the HTS conductors 23 are soldered to and supported in a tubular copper connector 29 by a solder connection 31 injected through a hole in the connector 29.

The copper connector 29 is also secured by a solder connection 31 to a pin 33 projecting inward from a heat exchanger 35 which is seated in a bore 37 in the divider plate 15. (See FIG. 1.)

The outer sections 17o of the lead elements include a central support member 39 in the form of an electrically insulating cylindrical red. The rod 39 is secured to the heat exchanger 35 by a screwed stud 41 which is threaded into the inner end of the rod 39. The outer section 17o of the lead element also includes an electrically insulating cylindrical sleeve 43 concentric with the central support rod 39 and forming therebetween an annular chamber 45. A pair of copper conductors 47 and 49 extend through the annular chamber 45. Preferably, these conductors 47 and 49 are copper wires which are wound spirally around the central support rod 39 to form a pair of helical flow passages 51 and 53 in the annular chamber 45. The inner ends of the conductors 47 and 49 are soldered in bores 55 and 57 respectively, in the heat exchanger 35. The upper ends of the copper conductors 47 and 49 are soldered in diametrically opposed axial slots 59 (see FIG. 3) in a copper top plug 61 which is seated in the upper support plate 19 and retained in place by a shoulder 63 engaged by a retention plate 65 secured to the upper support plate 19 by screws 67. An O-ring seal 69 seated in an annular groove 71 in the top copper plug 61 seals against the sleeve 43.

Figure 3:
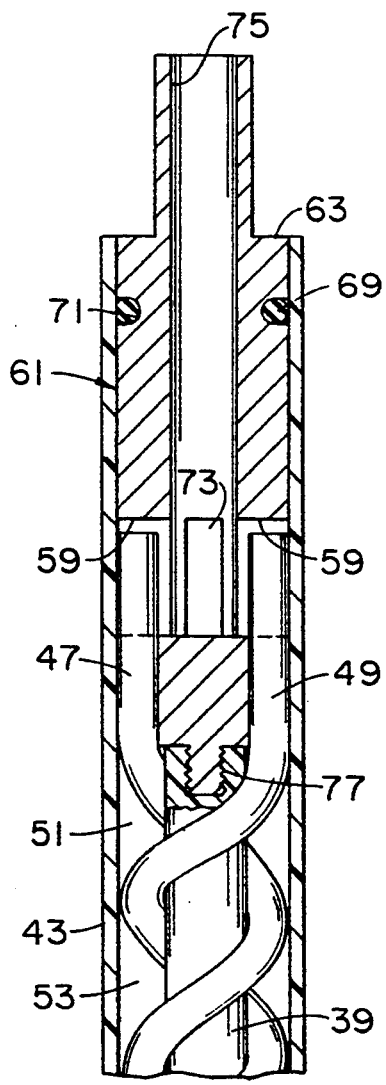
FIG. 3 is a fragmentary longitudinal sectional view through the upper portion of the lead element of FIG. 2.

As shown more clearly in FIG. 3, the top copper plug 61 has additional diametrically opposed axial slots 73 which connect the helical flow passages 51 and 53 with a central bore 75. The central support rod 39 is secured at its outer end to the top copper plug 61 by a threaded stud 77 which screws into the end of the rod 39.

The lead elements 17 are cooled by cryogen vaporized from the pool 7 in the cryostat or cryogen vapor flow introduced into the pool 7 region in the cryostat. The cryogen vapor enters the tubular enclosure 9 through orifices 79 in the inner end 9i. The vapor circulates around and flows outward over the HTS conductors 23 Typically, the cryogen is helium which has a boiling point of about 4° K. The temperature of the helium vapor increases as it flows upward through the inner section 11 of the tubular enclosure and reaches an intermediate temperature which is below the critical temperature of the HTS conductors 23 at the divider plate 15. The HTS conductors 23 therefore remain superconducting and generate no joule heating. The cryogen vapor however removes conduction heating which leaks into the HTS conductors 23.

The heat exchanger 35 has a number of radial slots 81 through which the cryogen vapor passes from the inner section 11 of the tubular enclosure into the helical flow passages 51 and 53. As the conductors 47 and 49 are normal conductors, they generate joule heating as well as conduction heating. The heat exchanger 35 has a mass, and a surface area exposed to the flow of the cryogen vapor defined in part by the slots 81 sufficient to create a heat flow equilibrium between the inner ends of the copper conductors 47 and 49 in the outer ends of the HTS conductors 23.

Because the different lead elements 17 can be carrying different power loads, and at times some may be carrying no load at all, there can be variations in the cooling requirements of the various lead elements. This and other factors can cause imbalances in the distribution of cryogen vapor in the various lead elements. In accordance with the invention, means are provided to regulate the distribution of cryogen vapor flow in the upper sections of the various lead elements 17.

Figure 2:
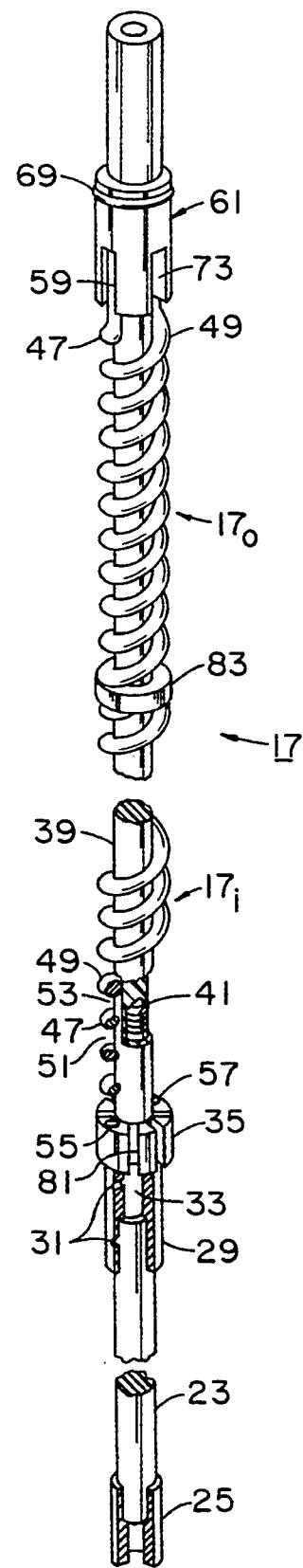
FIG. 2 is a cut-away isometric view of a lead element which forms part of the power lead of FIG. 1.

In the embodiment of the invention shown in FIGS. 1–3, this regulating means takes the form of a flow baffle 83 at an intermediate point in the annular chamber 45 which blocks the flow of cryogen vapor through the helical flow passages 51 and 53. Aperture 85 in the electrically insulating sleeve 43 inward of the flow baffle 83 diverts cryogen vapor from the inner sections of the helical flow passages 51 and 53 into a chamber 87 formed by the tubular enclosure 9. The cryogen vapor from the various lead elements 17 mixes in the chamber 87 and then reenters the helical flow passages 51 and 53 through additional apertures 89 in the electrically insulating sleeve 43 outward of the flow baffle 83. The mixed cryogen vapor then flows outward through these helical passages 51 and 53, through the slots 73 in the top plug 61 and into the central bore 75 which forms a vent for venting the cryogen vapor to a gaseous helium reservoir or the atmosphere. A baffle plate 91 is provided in the tubular enclosure 9 above the apertures 89 to prevent the mixed cryogen vapor from flowing outward in the tubular enclosure 9 and becoming warmed before reentering the helical flow passages 51 and 53 through the apertures 89.

The tubular enclosure 9, support plates 19 and 21, divider plate 15, central support rods 39, sleeves 43, flow baffles 83 and baffle plates 91 are all made of suitable thermal and electrically insulating material. A suitable material is G-10 which is widely used in cryostat structures. One alternative material is MICARTA.

Figure 4:
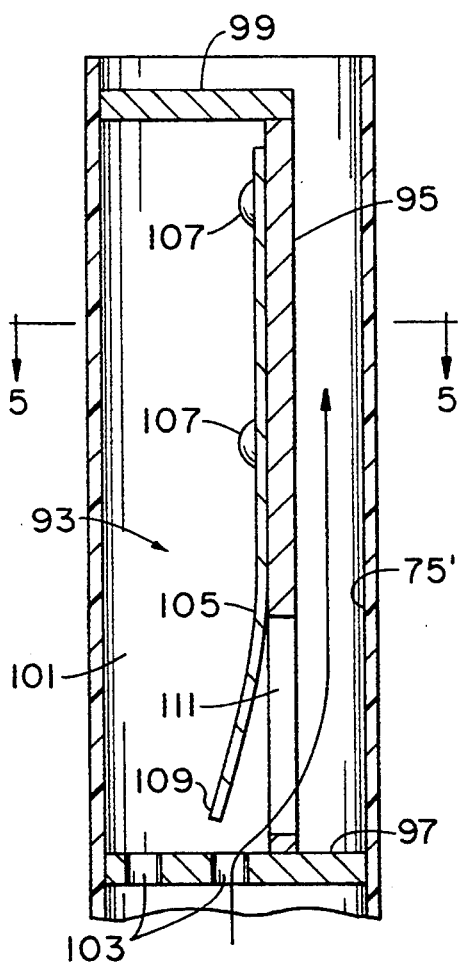
FIG. 4 is a longitudinal sectional view through a section of a lead element illustrating one embodiment of a thermally responsive flow regulating valve in accordance with the invention.
Figure 5:
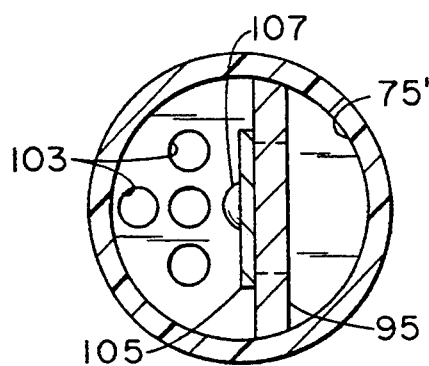
FIG. 5 is a cross-sectional view taken along the line 5—5 of the lead element of FIG. 4.

Other means for regulating the distribution of cryogen vapor in the lead elements 17 include thermally responsive valves. FIGS. 4 and 5 illustrate one embodiment of such a valve. This thermally responsive valve 93 is provided in, for instance, the cylindrical bore 75 of the lead element. A valve plate 95 is supported axially in The bore 75' by an inlet plate 97 and an upper support plate 99 to form an inlet chamber 101. Cryogen vapor enters the inlet chamber 101 through inlet holes 103 in the inlet plate 97. A bimetal strip 105 secured by rivets 107 to the valve plate 95 has a free end 109 cantilevered over a valve orifice 111 in the valve plate 95 to meter the flow of cryogen vapor indicated by the arrow in FIG. 4. As the temperature of the cryogen vapor approaches ambient temperature at the outer ends of the bore 75', it is preferred that the valve 93 be located adjacent this end so that conventional bimetal strips can be utilized.

Figure 7:
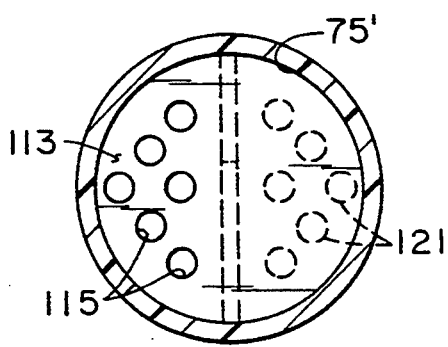
FIG. 7 is a cross-sectional view taken along the line 7—7 through the lead element shown in FIG. 6.
Figure 6:
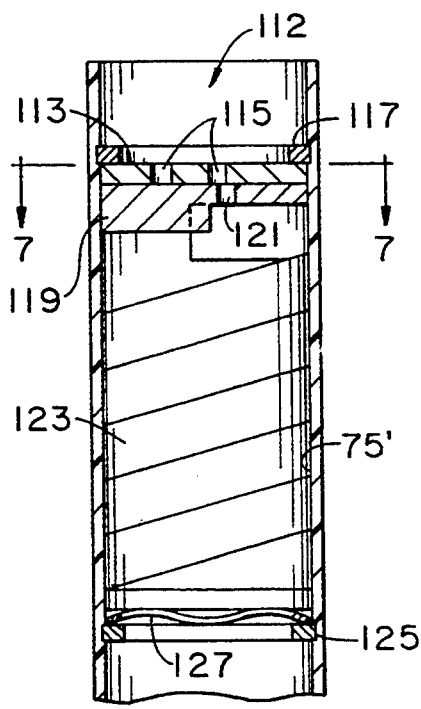
FIG. 6 is a longitudinal sectional view through a lead element showing another embodiment of a thermally responsive flow regulating valve in accordance with the invention.

FIGS. 6 and 7 show an alternate embodiment of a thermally responsive valve. This valve 112 includes a circular valve plate 113 having at least one valve orifice 115 and retained transversely within the bore 75' by an upper retaining ring 117. A circular valve element 119 having at least one metering aperture 121 therein is in sliding contact with the underside of the valve plate 113. A helical bimetal actuator 123 retained within the bore 75' by a lower retaining ring 125 is connected at a free upper end to the circular valve element 119. A wave spring 127 biases the valve element 119 against the valve plate The helical bimetal actuator 123 expands and contracts with changes in temperature within the bore 75' to rotate the valve element 119 against the lower face of the valve plate 113 to vary the registration of the metering aperture(s) 121 in the valve element with the orifice(s) 115 in the valve plate 113 to regulate the flow of cryogen vapor through the bore 75'.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A vapor cooled multiple circuit power lead carrying power at a given power level for penetrating a cryostat having a cryogen chamber containing a cryogen at a predetermined temperature said power lead comprising:
   a tubular enclosure;
   divider means dividing said tubular enclosure into an inner section extending from an inner end of said tubular enclosure outward to said dividing means, and an outer section extending outward from said divider means to an outer end of said enclosure;
   a plurality of lead elements laterally spaced within said tubular enclosure to form multiple circuits and each including an inner high temperature superconducting section extending through said inner section of said tubular enclosure and comprising an inner conductor composed of a material which is superconducting below an intermediate temperature between said predetermined temperature and ambient temperature at said given power level, and an outer normal conductor section extending through said outer section of said tubular enclosure and comprising an electrically insulating central support, an electrically insulating sleeve concentric with said central support and forming therebetween an annular chamber, and normal elongated outer conductor means wound spirally in said annular chamber and extending across said annular chamber to form helical flow passage means; and
   means introducing a flow of cryogen vapor into said inner end of said inner section of said tubular enclosure to flow outward and cool said inner conductors below said intermediate temperature, flow directing means at said divider means directing said flow of cryogen vapor from said inner section into said helical flow passage means, and vent means venting said cryogen vapor from said helical flow passage means adjacent said outer end of said tubular enclosure.

2. The power lead of claim 1 wherein said outer normal conductor section includes regulating means regulating distribution of cryogen vapor flow through said helical flow passage means.

3. The power lead of claim 2 wherein said regulating means includes baffle means blocking flow in said helical flow passage means at an intermediate point in each of said normal conductor sections of said lead elements, first apertures in said electrically insulating sleeves inward from said baffle means directing vapor flow from said helical flow passage means into said tubular enclosure where vapor from said plurality of outer lead elements mixes, and second apertures in said electrically insulating sleeves outward of said baffle means through which mixed cryogen vapor reenters said helical flow passage means and flows outward to said vent means.

4. The power lead of claim 3 wherein said tubular enclosure further includes baffle means outward of said second apertures blocking flow of mixed cryogen vapor outward to said outer end of said tubular enclosure outside said electrically insulating sleeves before reentering said helical flow passage means through said second apertures.

5. The power lead of claim 2 wherein said regulating means comprises thermally responsive valve means in said lead element outer sections.

6. The power lead of claim 1 wherein said flow directing means comprises an electrically conductive heat exchanger connecting said inner conductors to said outer normal conductor means and having a mass and flow passages with a surface area over which said cryogen vapor flows to effect substantially zero heat flow between said inner conductors and outer conductors means.

7. The power lead of claim 6 wherein said heat exchanger comprises a cylindrical member with radial slots in a periphery thereof.

8. A vapor cooled multiple circuit power lead carrying power at a given power level for penetrating a cryostat having a cryogen chamber containing a cryogen at a predetermined temperature, said power lead comprising:

a tubular enclosure;

a plurality of lead elements laterally spaced within said tubular enclosure to form multiple circuits and each including an electrically insulating central support, an electrically insulating sleeve concentric with said central support and forming therebetween an annular chamber, and elongated conductor means in said annular chamber and extending across said annular chamber to form flow passages therein;

means introducing a flow of cryogen vapor at an inner end of said flow passages and;

vent means adjacent an outer end of said flow passages venting said flow of cryogen vapor from said flow passages.

9. The power lead of claim 8 including baffle means blocking flow in said flow passages at an intermediate point in each of said lead elements, first apertures in said electrically insulating sleeves inward from said baffle means directing said flow of cryogen vapor from said flow passages into said tubular enclosure where cryogen vapor from said plurality of lead elements mixes, and second apertures in said electrically insulating sleeves outward of said baffle means through which a flow of mixed cryogen vapor reenters said flow passages and flows outward to said vent means.

10. The power lead of claim 9 wherein said tubular enclosure further includes baffle means outward of said second apertures blocking flow of mixed cryogen raper outward to said outer end of said tubular enclosure outside said electrically insulating sleeves before reentering said flow passages through said second apertures.

* * * * *